United States Patent [19]

Lee et al.

[11] 4,197,376

[45] Apr. 8, 1980

[54] TOUGH POLYBLENDS WITH IMPROVED HEAT DISTORTION RESISTANCE

[75] Inventors: Yoon C. Lee; Quirino A. Trementozzi, both of Springfield, Mass.

[73] Assignee: Monsanto Company, St. Louis, Mo.

[21] Appl. No.: 865,049

[22] Filed: Dec. 27, 1977

[51] Int. Cl.² .............................................. C08L 55/02
[52] U.S. Cl. ...................................... 525/74; 525/70; 525/80; 525/84
[58] Field of Search ..................................... 260/876 R

[56] References Cited

U.S. PATENT DOCUMENTS

| | | | |
|---|---|---|---|
| 3,267,061 | 8/1966 | Senior, Jr. et al. | 260/29.7 T |
| 3,642,949 | 2/1972 | Stafford et al. | 260/876 |
| 3,652,726 | 3/1972 | Nield et al. | 260/876 |
| 3,919,354 | 11/1975 | Moore et al. | 260/880 B |
| 4,108,925 | 8/1978 | Lee, Jr. | 260/876 R |
| 4,113,797 | 9/1978 | Lee, Jr. | 260/876 R |

FOREIGN PATENT DOCUMENTS

| | | | |
|---|---|---|---|
| 1315219 | 5/1973 | United Kingdom | 260/876 |
| 1452141 | 10/1976 | United Kingdom | 260/857 |

*Primary Examiner*—J. Ziegler
*Attorney, Agent, or Firm*—David Bennett; William J. Farrington; Edward P. Grattan

[57] ABSTRACT

Polyblends are disclosed which comprise an ABS polymer blended with a rubber-modified polymer of a monoalkenyl aromatic monomer and an unsaturated dicarboxylic acid anhydride.

19 Claims, No Drawings

TOUGH POLYBLENDS WITH IMPROVED HEAT DISTORTION RESISTANCE

BACKGROUND OF THE INVENTION

This invention relates to polyblends and specifically to polyblends of ABS polymers with styrene/maleic anhydride copolymers having a rubber modifier incorporated therein.

ABS polymers are formed by the polymerization of styrene and acrylonitrile in the presence of a diene rubber such as polybutadiene. They may be made by mass, suspension or emulsion polymerization techniques. The diene rubber is present as a substrate grafted with a styrene/acrylonitrile superstrate. A styrene/acrylonitrile matrix is usually formed simultaneously with the grafting reaction. Further matrix may be added subsequently in a blending operation to obtain the desired formulation.

Besides the compositions described above, the term "ABS polymer" is often used to cover variations in this formulation through substitution of other copolymerizable monomers, in whole or in part, for one or more of the components of standard ABS. Thus, the acrylonitrile can be wholly or partially substituted for example by methacrylonitrile or wholly substituted by methyl methacrylate; polybutadiene can be replaced with a wide range of other rubbers having a Tg (glass transition temperature) below 0° C. and preferably below −30° C.; and styrene can be replaced by substituted styrene such as halostyrenes, α-methyl styrene and the like. All such variations are embraced by the term ABS polymer as it is used herein.

The term "ABS" is conventionally used to describe compositions comprising the "styrene" and "acrylonitrile" monomer components in a weight ratio of from 80:20 to 60:40.

ABS polymers are very well known in the field of molding materials as being suitable for the production of tough, moldable materials with good surface properties. ABS is adapted for use in such diverse fields as automotive parts, housings for major appliances such as refrigerators and washing machines, television cabinets, body work for small appliances such as blenders, mixers, pocket calculators, radios, telephones and containers for food-stuffs. The polymers however, have a disadvantage in that they generally have too low a heat distortion temperature for certain uses where the item made from the polymer is expected to operate at a relatively high temperature, without becoming distorted. This disadvantage somewhat limits the range of potential end-uses for which ABS is adapted. The present invention provides a composition based on ABS which has a significantly higher heat distortion temperature than ABS and is therefore capable of performing adequately under higher temperature conditions while retaining much of the toughness that characterizes ABS polymers.

DISCUSSION OF THE PRIOR ART

The production of ABS is very well known in the art and is described in such patents as U.S. Pat. Nos. 3,509,237; 3,509,238; 3,851,014; and 3,903,200. A very comprehensive treatment of the subject is found in "ABS Plastics" by C. H. Basdekis (Rheinhold-1964). It has been blended with a very wide range of other polymers ranging from polyvinyl chloride (U.S. Pat. No. 2,802,809) to polycarbonates (U.S. Pat. No. 3,130,177).

In U.S. Pat. No. 3,642,949 an ABS polymer is blended with a copolymer of a vinylaromatic monomer (95-65 parts by weight) and an unsaturated dicarboxylic anhydride, or an imide or N-alkylimide derivative of such an anhydride (5-35 parts by weight). Such polymers provide molding compositions with improved heat distortion characteristics but the improvement is obtained at the expense of a significant decrease in the impact strength of the ABS polymer.

It is further known that styrene may be copolymerized with maleic anhydride using special techniques such as are described in U.S. Pat. Nos. 2,971,939; 2,989,517; 3,336,267 and British Pat. No. 1,234,395.

It is also generally known that the incorporation of rubber in polystyrene results in an improvement in impact strength especially when the styrene is polymerized in the presence of the rubber. Such a product is conventionally called high impact polystyrene and comprises a rubber substrate grafted with the polymerizing monomer, dispersed as particles in a matrix of the styrene polymer. Rubber-modified styrene/maleic anhydride polymers having this conventional structure are described in U.S. Pat. No. 3,919,354.

A polyblend has now been discovered which exhibits toughness and high heat distortion temperature and is therefore, particularly useful for producing molded objects.

STATEMENT OF THE INVENTION

The present invention provides a polyblend comprising:

A. from 10 to 90% by weight of an ABS polymer having a rubber content in the range of 5 to 70% by weight; and B. from 90 to 10% by weight of a polymeric composition comprising
  (1) a rubber substrate polymer having a glass transition temperature below 0° C.; and
  (2) a superstrate polymer grafted onto the rubber substrate which comprises from 40 to 85% by weight of a monoalkenyl aromatic monomer and from 15 to 35% by weight of an unsaturated dicarboxylic acid anhydride.
    the amount of the rubber substrate being from 2 to 30% by weight of the polymeric composition,
wherein the total amount of rubber in the polyblend is in the range of from 5 to 40% of the total weight of the polyblend, with the proviso that each of components A and B, contribute at least 5% of the total amount of rubber in the polyblend.

The superstrate polymer of component B can optionally contain 0 to 30% by weight of an additional termonomer that is copolymerizable with the other monomers in the presence of the rubber substrate.

During graft polymerization of the superstrate onto the substrate polymer it is found that some portions of the monomers polymerize together to form a matrix polymer without becoming grafted on to the substrate. The present invention also contemplates the presence of such matrix polymers in both the polymeric composition (component B) and the ABS polymer (component A).

It is surprisingly found that the combination of heat distortion temperature and high impact strength of the above polyblends is not obtained with the compositions of the prior art. As an example, it is found that a blend of ABS and a polybutadiene rubber reinforced styrene/maleic anhydride copolymer has better impact strength than does either a blend of ABS with a styrene/maleic anhydride copolymer or a styrene/acrylonitrile copolymer blended with a polybutadiene rubber modified styrene/maleic anhydride copolymer, even when each composition is formulated to give the same overall proportions of rubber in the polyblend and the same relative proportions of styrene and maleic anhydride. Moreover, this improved impact strength is obtained with only a minor reduction in the heat distortion temperature consequent on the overall reduction of the maleic anhydride content. Since it is believed that the rubber is the toughness producing component and the maleic anhydride is the component improving the heat distortion temperature, this result is indeed surprising and indicative of synergism within the polyblend. The evidence for this conclusion is set forth in some detail in the Examples presented hereinbelow.

In addition to the above polyblends, certain of the rubber-modified terpolymers which may be blended with the ABS to produce the polyblends, are themselves useful per se and possess unexpectedly advantageous properties.

ABS POLYMER

As indicated above the term "ABS polymer" is intended to embrace the variations of the components of such compositions that are known in the art.

One such variation which is particularly useful in designing the polyblend for a specific end-use is the production of ABS by controlling the amount of matrix polymer formed during the graft polymerization of the styrene and acrylonitrile components on to the rubber substrate polymer. Additional separately prepared matrix polymer of the same or different composition can be added to the ABS in order to achieve some degree of variation of the properties of the final product. This approach permits some flexibility in the final composition of the ABS polymer. Thus, the grafted substrate may be for example, polybutadiene grafted with styrene and acrylonitrile while the separately prepared matrix polymer is a copolymer of alpha-methyl-styrene with acrylonitrile.

The grafted rubber may be in the form of particles with a narrow or broad size range or it may contain particles in two different size ranges in accordance with the teachings in U.S. Pat. No. 3,509,237 (incorporated herein by reference), so as to obtain a good balance of strength and good surface qualities.

It is therefore sometimes preferred that from 5 to 50% and preferably from 10 to 30% by weight of the rubber in the ABS polymer is in the form of grafted rubber particles with a weight average particle size of about 0.8 to 4.0 microns, the balance of the rubber being in the form of grafted particles with a weight average particle size of about 0.1 to 0.25 micron.

Other preferred compositions have all the rubber present as grafted particles with a narrow particle size distribution and a weight average size in the range of from 0.3 to 0.8 micron and preferably 0.4 to 0.7 while still others have grafted rubber particles with a broad particle size distribution about a weight average size of from 0.3 to 0.6 micron. Each variation has specific benefits to confer in terms of physical properties and surface characteristics.

The amount of rubber (ungrafted basis) in the ABS component is in the range of from 5 to 70% and preferably from 5 to 50% based on the total weight of ABS (grafted rubber plus matrix polymer). The ABS component provides at least 5% and preferably from 60 to 90% of the total weight of rubber (ungrafted basis) in the polyblend.

As indicated above the term "ABS" as used herein is understood to indicate a polymer in which the styrene and acrylonitrile components (or their conventional partial or complete replacements) are present in weight ratios of from 80:20 to 60:40 such as from 75:25 to 65:35. These ratios are preferably also applicable to the superstrate and matrix polymers separately.

The preferred weight ratio of the rubber substrate to graft superstrate is from 80:20 to 40:80 and more preferably 60:40 to 40:60.

POLYMERIC COMPOSITION

The polymeric composition blended with the ABS to form the polyblend of the invention comprises a rubber substrate polymer having a glass transition temperature (Tg) below 0° C. and a superstrate polymer grafted thereon which comprises from 40 to 85% such as from 70–80% by weight of a monoalkenyl aromatic monomer and from 15 to 35% and preferably 20–30% by weight of an unsaturated dicarboxylic acid anhydride.

During the graft polymerization of the superstrate on the substrate rubber, it is found that some portions of the monomers polymerize together to form a matrix polymer without becoming grafted to the substrate. The presence of such matrix polymer is also contemplated in this invention. It is of course, not necessary that all the matrix polymer be formed during the grafting process. It is within the purview of this invention to produce the polymer composition by adding separately prepared matrix polymer to the grafted rubber substrate to give any desired rubber level. Any matrix polymer so added is of course subject to the same compositional range restrictions as apply to the superstrate polymer though they need not be identical compositions.

The rubber substrate component of the polymeric composition can be selected from a wide range of alternatives including butadiene polymers and copolymers, polyisoprene, polychloroprene, polyacrylate rubbers, and ethylene/propylene/diene rubber (EPDM), polypentenamer and ethylene/vinyl acetate rubbers. Copolymers of cyclopentane with a minor proportion of a non-cyclic α-olefin such as for example a copolymer of 55 to 95% of cyclopentene with from 5 to 45% of ethylene are particularly useful. Other rubbers which have a Tg below 0° C. and which may be grafted with the monomers used to produce the polymeric composition can readily be supplied by the skilled reader. The preferred rubbers have a Tg below about −30° C. and the most preferred are polybutadiene and copolymers of butadiene with up to 40% by weight of a styrene or acrylonitrile comonomer.

The monoalkenyl aromatic monomer used in component B is preferably styrene but styrene derivatives such as chlorostyrene, vinyl toluene, alpha-methyl styrene, alpha-methyl vinyl toluene, 2,4-dichlorostyrene and 2-chloro-4-methylstyrene may be substituted for styrene in whole or in part if desired.

The unsaturated dicarboxylic acid anhydride is most preferably maleic anhydride though any of the homologues of maleic anhydride such as itaconic, citraconic and aconitic anhydrides can also be used.

The polymeric composition can further comprise up to 30% by weight (based on the polymerizable monomer) of a copolymerizable monomer. The selection of this copolymerizable monomer may be influenced by factors such as the ease with which the copolymerization takes place, the compatibility of the monomers, phase differences and the like. Copolymerizable monomers can be identified among monomers such as olefins, aliphatic or aromatic esters of unsaturated acids, unsaturated ethers, unsaturated nitriles, vinyl halides, vinyl esters and the like.

In practice a preferred group of copolymerizable monomers includes $C_4$ to $C_6$ α-olefins, $C_1$ to $C_3$ alkyl esters of (meth)acrylic acid, methacrylonitrile and acrylonitrile.

Where the copolymerizable monomer is an olefin it can for example, be cyclohexene, n-hexene, isopentene, n-pentene, n-butene or isobutylene. The acrylate ester can be methyl acrylate, ethyl acrylate or propyl acrylate; the methacrylate esters, which are generally preferred over the acrylate esters, are methyl methacrylate, ethyl methacrylate or propyl methacrylate. The preferred copolymerizable monomers are acrylonitrile, methyl methacrylate and isobutylene.

The polymeric composition is conveniently prepared by dissolving the rubber in a solution of the monoalkyl aromatic component and, if present, the copolymerizable monomer in a suitable solvent, and then polymerizing the solution with the anhydride component in the manner described in, for example, U.S. Pat. No. 2,971,939, U.S. Pat. No. 3,336,267 and U.S. Pat. No. 3,919,354 which are incorporated herein by reference.

Where a termonomer is present a polymerization schedule may be devised on the basis of the relative reactivities of the monomers. Typical schedules involve preparing an initial reaction mixture comprising a solvent, the bulk of the alkenyl aromatic monomers, a very small amount (or none) of the anhydride monomer and the major proportion of the termonomer. The rubber is dissolved in this mixture and the balance of the monomers is added slowly during the polymerization.

The amount of rubber substrate (ungrafted basis) in the polymeric composition, which includes the grafted substrate and any matrix polymer present, is in the range from 2 to 30% by weight based on the weight of the polymeric composition. Preferably, however, the rubber substrate represents from 5 to 25% of the weight of the polymeric composition.

The ratio of proportions by weight of monoalkenyl aromatic monomer to unsaturated dicarboxylic acid anhydride polymerized together in the presence of the rubber and in the absence of the copolymerizable termonomer to form the polymeric composition can be from 85:15 to 65:35, but a ratio of from 80:20 to 70:30 is particularly preferred. The maleic anhydride compositional range is in part determined by the need to provide substantial compatibility with the ABS component. It is found that the ABS (which has 20-40% by weight of AN) is increasingly incompatible with styrene/maleic anhydride polymers as the maleic anhydride content is reduced below 15% and processability considerations place an upper limit on the amount of the anhydride that can practicably be used.

Where a termonomer is present, the preferred proportions depend on the actual termonomer. Thus, where the termonomer is a $C_4$ to $C_6$ α-olefin such as isobutylene it is preferred that it be present in an amount from 2 to 10% by weight based on the copolymerized monomers. Where the termonomer is an alkyl ester of (meth) acrylic acid such as methylmethacrylate or an unsaturated nitrile such as acrylonitrile, the corresponding amount is preferably from 2 to 20% by weight. Rubber-modified terpolymers having these preferred proportions of the specified termonomers, i.e., 2 to 10% for the α-olefin, and 2-20% for the (meth)acrylate esters and nitriles, are themselves useful per se as molding compositions having unexpectedly advantageous properties such as, in the case of the methyl methacrylate terpolymer, improved tensile strength and gloss over conventional RM-SMA.

The polyblend of the invention comprises from 90 to 10% by weight of an ABS polymer (A) and from 10 to 90% by weight of the polymeric composition (B) but the preferred weight proportions are from 75 to 25 of A and from 25 to 75 of B. Within these ranges component A and component B may be chosen to emphasize the heat distortion temperature (by increasing component B and/or the amount of anhydride therein) or impact properties (by increasing component A and/or the amount of rubber substrate in both A and B).

The rubber (ungrafted basis) provided by A and B together comprises from 5 to 40% and preferably 10 to 30% by weight of the polyblend and is distributed between the first and second compositions such that each contributes at least 5% and preferably at least 10% of the total rubber content measured as ungrafted substrate. Usually, the major proportion of the rubber present measured as ungrafted substrate, is contributed by the ABS polymer.

The polyblend can contain other additives such as for example, additional ungrafted rubber components, flame retardants, smoke suppressants, antioxidants, stabilizers, lubricants, antistatic additives, colorants and fillers.

The blending of components A and B is most conveniently achieved by extrusion or by compounding in a Banbury, Brabender or similar mixing device. Care, however, must be taken that the temperature at which the components are blended does not excess the temperature at which either component decomposes.

DESCRIPTION OF THE PREFERRED EMBODIMENTS

The present invention is further described by reference to the following Examples which are for the purposes of illustration only and are not intended to imply any limitation of the scope of the invention.

The Examples illustrate the results of varying the composition of the polyblend and the surprising advantages obtained by providing that both components of the polyblend are rubber-modified, even when the total amount of rubber in the polyblend is kept constant. They also show that this phenomenon is apparent even when the relative amounts of the first and second compositions are varied.

In each Example the components were blended in an extruder and the resulting polyblend was formed into samples which were then tested to determine the Izod impact strength, (ASTM D-256), (in some cases) the Falling Dart Impact Strength (FDI), (ASTM D-1709 on a 2.5 mm thickness sample), and heat distortion temperature (DTUL) under a load of 18.6 kg./sq.cm. (ASTM D-648).

The components used in the examples were as follows:

α-MS/AN—a copolymer of α-methylstyrene and acrylonitrile containing approximately 28% AN and up to 10% of styrene, which is present as a separately prepared matrix polymer.

S/AN—a copolymer of styrene and acrylonitrile in a 72:28 weight ratio, present as a separately prepared matrix polymer.

ABS-1—prepared by the graft suspension polymerization of acrylonitrile and styrene in a weight ratio of 28:72 in the presence of polybutadiene. ABS-I contains 14% by weight of polybutadiene.

ABS-2—prepared by the graft emulsion polymerization of acrylonitrile and styrene in a weight ratio of 30:70 in the presence of polybutadiene. ABS-2 contains 40% by weight of polybutadiene.

S/MA-1—a copolymer of styrene and maleic anhydride in a weight ratio of about 76:24.

S/MA-2—a copolymer of styrene and maleic anhydride in a weight ratio of about 83:17.

RM-S/MA—a polymer formed by polymerizing styrene and maleic anhydride in a weight ratio of 76:24 in the presence of 14.5% by weight of a butadiene/styrene block copolymer rubber to give an SMA polymer grafted on to the rubber substrate and free SMA matrix polymer.

The results of testing blends of certain of the above components are set out in Table 1 below. All parts are by weight unless otherwise specified. Examples marked (c) are for the sake of comparison.

The Izod impact strengths were measured using 3.2×12.7×63.5 mm compression molded samples, notched 2.54 mm.

The DTUL figures given are for 3.2×12.7×127 mm compression molded samples tested under a 18.6 kg./sq.cm. stress.

Examples 17 to 33 and 40–43 include 0.2% and 0.3% by weight respectively, of 2,6-ditertiarybutyl-4-methyl phenol (an antioxidant) and magnesium stearate (a lubricant).

used, the impact strength is very low unless the S/MA is rubber modified.

From a comparison of Examples 17, 18 and 19 it can be seen that where there is no rubber contribution from the SMA there is a dramatic drop in impact strength.

From Examples 9, 10 and 11, it can be seen that replacement of the separately prepared α-MS/AN matrix polymer associated with the ABS with S/AN or even S/MA has only a marginal effect on the impact properties.

Finally, it can be seen that an increase in the S/MA content, whether rubber modified or not improves the DTUL and that this property is also improved by substitution of α-MS/AN for S/AN as the matrix polymer of the ABS component.

In addition to the above polyblends it is found that blends of ABS with a rubber modified polymeric composition that comprises the optional termonomer have advantageous physical properties. These polyblends are now further described in the following Examples.

EXAMPLES 20–29

These Examples describe the production of rubber-modified polymers of styrene, maleic anhydride and methyl methacrylate and the properties of polyblends of such copolymers with ABS.

The process described below is that used in Example 20 but essentially the same process was used in all the other Examples with the difference that the initial monomer charge and the late added charge were changed in accordance with a computer model based on monomer reactivities to obtain polymers of different compositions. Typical late addition schedules of specified polymers predicted on the basis of the model are shown in Table II.

TABLE 1

SUMMARY OF EXAMPLES 1 to 19

| Example | Total % by Wt. Rubber* in Blend | First Composition α-MS/AN | S/AN | ABS-I | ABS-2 | Second Composition S/Ma-1 | S/MA-2 | RM-S/MA | DTUL °C. | Izod J/m Notch X$10^2$ | Falling Dart Joule |
|---|---|---|---|---|---|---|---|---|---|---|---|
| 1(c) | 20(0) | 44 | | 9.2 | 46.8 | | | | 91 | 2.7–3.2 | ** |
| 2(c) | 20(0) | 24 | | 9.2 | 46.8 | 20 | | | 99 | 0.7 | ** |
| 3 | 20(2.9) | 31.2 | | 9.2 | 39.5 | | | 20 | 96 | 2.7 | ** |
| 4(c) | 20(0) | 4 | | 9.2 | 46.8 | 40 | | | 106 | 0.43 | ** |
| 5 | 20(9.8) | 18.5 | | 9.2 | 32.3 | | | 40 | 105 | 1.72 | ** |
| 6(c) | 20(0) | | | | 50 | 50 | | | 96 | 0.33 | 4.3 |
| 7 | 20(7.25) | 18.1 | | | 31.9 | | | 50 | 106 | 1.73 | 61.0 |
| 8(c) | 20(0) | | | | 50 | | 50 | | 105 | 0.48 | ** |
| 9 | 15(9.06) | | | | 15 | | 22.5 | 62.5 | 125 | 1.26 | ** |
| 10 | 15(9.06) | 22.5 | | | 15 | | | 62.5 | 112 | 1.19 | 47.3 |
| 11 | 15(9.06) | | 22.5 | | 15 | | | 62.5 | 109 | 1.19 | 52.9 |
| 12(c) | 15(0) | | | | 37.5 | | 62.5 | | 116 | 0.22 | 4.1 |
| 13 | 16.1(2.12) | | | | 35 | | 50 | 15 | 111 | 0.55 | ** |
| 14(c) | 17.8(0) | | | | 44.5 | | 55.5 | | 109 | 0.24 | ** |
| 15 | 17.8(4.24) | | | 9.2 | 30.8 | | 30 | 30 | 107 | 1.74 | ** |
| 16(c) | 13.3(0) | | | 9.2 | 30 | | 60.8 | | 113 | 0.43 | ** |
| 17(c) | 7 (7) | 51.7 | | | | | | 48.3 | 103 | 0.47 | ** |
| 18(c) | 7 (0) | | | 17.5 | | 82.5 | | | 116 | 0.19 | ** |
| 19(c) | 7 (0) | | | 17.5 | | | 82.5 | | 120 | 0.19 | ** |

*Figure in parentheses is % by weight of rubber from the RM-SMA.
**Not tested.

From a comparison of the groups of Examples 2 and 3, 4 and 5; 6, 7 and 8; 9, 10, 11 and 12; and 17, 18 and 19, it can clearly be seen that for a given amount of rubber in the polyblend the best impact properties (Izod and F.D.I.) are obtained when the rubber is distributed between the ABS and the polymeric compositions.

It can be seen from Examples 6, 7 and 8 that while the DTUL may vary substantially with the S/MA polymer An agitated resin kettle was charged with 316 g. of styrene, 22.6 g. of methylmethacrylate, 0.5 g. of tris-nonylphenyl phosphate (a stabilizer) and a solvent mixture consisting of 50 g. of methyl ethyl ketone (MEK) and 75 g. of toluene. In this mixture were dissolved 44.2 g. of polybutadiene rubber.

A solution of 0.6 g. of azobisisobutyronitrile (AIBN) in 30 ml of MEK was prepared. 5 Ml of this solution was added to the solution in the resin kettle and the rest was added at a rate of 3 ml/hour thereafter.

The reaction mixture was raised to 85° C. and maintained at that level while late addition of a solution of 97 g. of maleic anhydride and 25 g. of methyl methacrylate in 97 g. of MEK was begun. The late addition was continued over a 6½ hour period. After addition was complete the reaction was held at the reaction temperature for a further hour before 0.5 g. of hydroquinone was added to short-stop the reaction.

The polymer was then separated from the solvent and residual monomer blended with any other desired polymeric components in an extruder and molded into samples for evaluation.

TABLE II

LATE MONOMER ADDITION SCHEDULE

| Target Polymer Composition (S/MA/MMA) | Initial Charge (S/MA/MMA) | Late Addition (S/MA/MMA) |
|---|---|---|
| 56.8/26.8/16.4 | 34.4/2.5/16.4 | 22.4/22.2/0 |
| 61.3/24/14.7 | 49.2/2.1/14.7 | 12.1/21.9/0 |
| 72/22/6 | 72/1.5/5.1 | 0/20.5/0.9 |
| 30/35/35 | 0/35/18.7 | 30/0/16.3 |
| 65/25/10 | 60/2.1/10 | 5/22.9/0 |
| 70/20/10 | 70/1.4/8.8 | 0/18.6/1.2 |
| 65/15/20 | 65/1.3/19.2 | 0/13.7/0.8 |
| 60/30/10 | 40.6/2.6/10 | 19.4/27.4/0 |

In each case the amounts given are percentages by weight based on the total final polymer weight.

The results obtained in Examples 20–29 are set forth in Table III below. Polymer (a) was obtained using a 65/25/10 target polymer addition schedule; polymers (b) and (c) used the 56.8/26.8/16.4 schedule.

When the reaction had begun, late addition of a solution of 357 g. of maleic anhydride and 0.75 g. of tertiary butyl peroctoate (initiator) dissolved in 388 g. of MEK was initiated. The addition rate was controlled such that it was completed over a period of 10 hours. Through that time the reaction was maintained at 90° C.

After the monomer addition had been completed, 47 ml of a solution of 2.5 g. of hydroquinone and 2.5 g. of Irganox 1076 (a proprietary antioxidant available under that name from Ciba-Geigy Corp.) in 57 g. of MEK to short-stop the reaction.

The polymer was separated from the solvent and from any residual monomer and was found to comprise the S/MA/IB monomers in a ratio of 58/35/7 respectively. The isobutylene content was measured by infrared analysis. This polymer was then extrusion blended with ABS and samples were tested.

The compositions prepared and the properties obtained are set out in Table IV below.

TABLE IV

| Polymer Blend Components | Examples | | | |
|---|---|---|---|---|
|  | 30 | 31 | 32 | 33 |
| RM-S/MA/IB (58/35/7) | 100 | 50 | 60 | 85.54 |
| ABS-1 |  | 10 | 10 |  |
| ABS-2 |  | 25.73 | 21.58 | 14.46 |
| α-MS/AN |  | 14.27 | 8.42 |  |
| Total Rubber (% by wt.) | 17.61 | 20.50 | 20.61 | 20.84 |
| Rubber from RM-S/MA/IB | 17.61 | 8.81 | 10.58 | 15.06 |
| Izod Impact J/m notch × 10² | 0.68 | 1.52 | 1.63 | 0.93 |
| DTUL °C. | 153 | 113 | 118 | 141 |

TABLE III

COMPOSITION AND PROPERTIES OF S/MA/MMA - (RUBBER-MODIFIED) - POLYMERS

| Polymer* | Example No. | | | | | | | | | |
|---|---|---|---|---|---|---|---|---|---|---|
|  | 20 | 21 | 22 | 23 | 24 | 25 | 26 | 27 | 28 | 29 |
| Composition in % by wt. S/MA/MMA |  |  |  |  |  |  |  |  |  |  |
| a. 68/26/6 | 100 | 50 | 60 | 70 |  |  |  |  |  |  |
| b. 59/26/15 |  |  |  |  | 100 | 50 | 60 |  |  |  |
| c. 56/25/19 |  |  |  |  |  |  |  | 100 | 50 | 60 |
| ABS-1 | — | 9.2 | 10 | — | — | 9.2 | 10 | — | 9.2 | 10 |
| ABS-2 | — | 30 | 30 | 30 | — | 30.4 | 30 | — | 31 | 30 |
| α-MS/AN | — | 10.8 |  |  | — | 10.4 |  |  | 9.8 |  |
| % Rubber (total) | 14.1 | 20 | 22 | 21.8 | 13.1 | 20 | 21.2 | 12.6 | 20 | 19.6 |
| % Rubber from RM-S/MA/MMA | 14.1 | 7.05 | 8.46 | 9.87 | 13.1 | 6.55 | 7.86 | 12.6 | 6.3 | 7.56 |
| Izod Impact Strength J/m notch × 10² | 0.78 | 1.81 | 1.81 | 1.64 | 0.73 | 1.68 | 1.73 | 1.01 | 1.92 | 1.88 |
| DTUL in °C. | 133 | 109 | 110 | 114 | 135 | 108 | 112 | 127 | 106 | 108 |

*Each polymer was formed by polymerizing the monomers in the presence of polybutadiene using the technique described above. The proportions quoted are those determined by analysis of the polymer composition.

The above results show that rubber-modified polymers of styrene, maleic anhydride and methyl methacrylate have very advantageous properties particularly when blended with ABS.

EXAMPLES 30 to 33

These Examples illustrate the production of a rubber modified styrene/maleic anhydride/isobutylene copolymer (RM-S/MA/IB) and its blends with ABS.

A resin kettle fitted with an agitator was charged with 750 g. of styrene, 125 g. of isobutylene and 165 g. of polybutadiene dissolved in 650 g. of methyl ethyl ketone, (MEK).

The temperature was raised to 80° C. and a small amount of azobisisobutyronitrile (initiator) dissolved in MEK was added to the reaction mixture.

From the above Examples it will be seen that the incorporation of isobutylene as a termonomer produces polymers with a desirable combination of properties.

EXAMPLES 34–39

The following Examples demonstrate the production of rubber-modified polymers of styrene, maleic anhydride and acrylonitrile and their blends with ABS.

The processes used are essentially those described in Examples 20–29 except that a different late addition schedule is required. The appropriate schedules, derived as above, from a computer model and based on the monomer reactivities, are set forth in Table V below.

TABLE V

LATE MONOMER ADDITION SCHEDULE

In each case the amounts given are percentages by weight based on the total final polymer weight.

| Target Polymer Composition S/MA/AN | | Initial Monomer Charge S/MA/AN | Late Monomer Charge S/MA/AN |
|---|---|---|---|
| 63/25/12 | | 63/3.3/10 | 0/21.7/2 |
| 60/30/10 | (Used in Table VI) | 60/4.7/18.7 | 0/25.3/1.3 |
| 65/20/15 | | 65/2.6/13.1 | 0/17.4/1.9 |
| 67/17/16 | | 67/2.0/13.6 | 9/15.0/2.4 |

In Table VI below the components and proportions of rubber-modified styrene/maleic anhydride/acrylonitrile polymer, (RM-S/MA/AN), alone and in blends with ABS, are described. The properties of the resultant polyblends are also set forth in the same Table.

The results indicate clearly the utility of RM-S/MA-/AN polymers in blends with ABS.

TABLE VI

| Polymer Components (Parts by Weight) | Examples | | | | | |
|---|---|---|---|---|---|---|
| | 34 | 35 | 36 | 37 | 38 | 39 |
| RM-S/MA/AN (68/26/6) (polybutadiene substrate) | 100 | 50 | 60 | 100 | 50 | 60 |
| ABS-1 | | 9.2 | 10 | | 9.2 | 10 |
| ABS-2 | | 28.7 | 30 | | 28.7 | 30 |
| α-MS/AN | | 12.1 | | | 12.1 | |
| Total Rubber (% by wt.) | 14.3 | 19.95 | 21.9 | 14.3 | 19.95 | 21.9 |
| Rubber from RM-S/MA/AN | 14.3 | 7.15 | 8.5 | 14.3 | 7.15 | 8.5 |
| Irganox 1076 (antioxidant) | 0.5 | 0.5 | 0.5 | 0.5 | 0.5 | 0.5 |
| Magnesium Stearate (lubricant) | 0.3 | 0.3 | 0.3 | 0.3 | 0.3 | 0.3 |
| Terpinoline (Chain transfer agent) | 0.1 | — | — | 0.1 | — | — |
| Properties | | | | | | |
| Izod impact strength J/m notch × $10^2$ | 0.81 | 1.57 | 1.57 | 1.12 | 1.87 | 1.97 |
| DTUL (°C.) | 136 | 109 | 112 | 136 | 109 | 111 |

Note:
Examples 34–36 were prepared using an RM-S/MA/AN polymer that had been devolatilized in an oven.
In Examples 37–39 the polymer was precipitated from n-hexane to separate it from unreacted monomer.

EXAMPLES 40–43

This series of Examples illustrate the use of a different catalyst known to favor grafting in the production of rubber-modified copolymers of styrene, maleic anhydride and methyl methacrylate.

The process described in Example 20 was followed except that the catalyst was changed from isobisisobutyronitrile to a mixture of tertiary butyl peroctoate and tertiary butyl peracetate. The results obtained are set forth in Table VII below. Example 43 is for the sake of comparison and shows the results obtained in the absence of the methyl methacrylate component. In this case the polymer used is RM-SMA.

TABLE VII

| Polymer Components (parts by weight) | Examples | | | |
|---|---|---|---|---|
| | 40 | 41 | 42 | |
| RM-S/MA/MMA 67/26/7 polymerized in presence of polybutadiene | 100 | 50 | 60 | — |
| RM-SMA (76/24) | — | — | — | 100 |
| ABS-I | — | 9.2 | 10 | — |
| ABS-2 | — | 32.6 | 30 | — |
| α-MS/AN | — | 8.2 | — | — |
| % Rubber from RM-S/MA/MMA from ABS | 11.3 | 5.5 14.5 | 6.8 13.4 | 14.5* — |
| Properties | | | | |
| Izod Impact Strength J/m notch × $10^2$ | 0.78 | 1.84 | 1.81 | 1.01 |
| DTUL - °C. | 131 | 108 | 112 | 119 |

*% rubber from RM-SMA.

Comparison of Examples 20 to 22 with 40 to 42, shows that using the peracid catalyst it is possible to get comparable impact strengths while using a smaller amount of total rubber.

Comparison of the RM-SMA with RM-S/MA/MMA shows the advantage of having the MMA present.

EXAMPLE 44

This Example shows the advantages of RM-S/MA/MMA terpolymers and their polyblends with ABS over the corresponding RM-SMA polymers and polyblends with ABS.

The compositions compared were as follows:
RM-SMA—76/24—S/MA polymerized in the presence of 14.5% of a butadiene/styrene block copolymer.
RM-S/MA/MMA—65/27/8—S/MA/MMA polymerized in the presence of 14.1% polybutadiene rubber.
RM-S/MA/MMA-ABS—50/50 weight percent blend of RM-S/MA/MMA with ABS—total rubber content—20% by weight.

Tensile strength is measured by the method of ASTM D-638. Compression molded samples were 3.2×12.7×127 mm thickness samples. Injection molded samples were 12.7×12.7×127 mm. Gloss was assessed by visual inspection and by reflectance (photovolts). The results are given in Table VIII below.

TABLE VIII

|  | RM-SMA | RM-S/MA/MMA | RM-SMA/ABS | RM-S/MA/MMA/ABS |
|---|---|---|---|---|
| DTUL (°C.) | | | | |
| (Comp. molded) | 117–121 | 130 | 106 | 109 |
| (Inj. molded) | 125–127 | 128–133 | 109 | 112 |
| Tensile Strength | | | | |
| at fail (Inj. Molded) kg/sq.cm. | 288.2 | 337.4 | 302.3 | 351.5 |
| Gloss | dull | fair | * | good |
| +Reflextance | <10 | * | * | >70 |

*not evaluated.
+from a surface illuminated at a 60° angle using a photovolt meter.

From these results it can be seen that distinct advantages in terms of physical properties are obtained by including methyl methacrylate as a termonomer in terms of heat distortion temperature, tensile strength and gloss of the final product.

EXAMPLES 45–54

These Examples illustrate the use of a polypentenamer, (PP), a homopolymer of cyclopentene and a copolymer of cyclopentene, (CoPP), to replace the polybutadiene used in the previous Examples.

The compositions described in Table IX below were made up using the following polymers.

PPM-S/MA—A 76/24 SMA polymer polymerized in the presence of a polypentenamer using a mixture of tertiary butyl peracetate and tertiary butyl peroctoate as the catalyst/initiator.

PPM-S/MA/MMA—A 66/25/9 S/MA/MMA polymerized in the presence of a polypentenamer using a mixture of tertiary butyl peracetate and tertiary butyl peroctoate as the catalyst/initiator.

CoPPM-S/MA—A 76/24 SMA copolymer polymerized in the presence of a copolymer of cyclopentene with ethylene (about 25%) using azobisisobutyronitrile as catalyst/initiator.

TABLE IX

| Polymer Composition Parts by weight | 45 | 46 | 47 | 48 | 49 | 50 | 51 | 52 | 53 | 54 |
|---|---|---|---|---|---|---|---|---|---|---|
| PPM-S/MA | 100 | 50 | 60 | — | — | — | — | — | — | — |
| COPP-S/MA | — | — | — | — | — | — | 100 | 50 | 100 | 50 |
| PPM-S/MA/MMA | — | — | — | 100 | 50 | 60 | — | — | — | — |
| ABS-1 | — | 9.2 | 10 | — | 9.2 | 10 | 0 | 9.2 | 0 | 9.2 |
| ABS-2 | — | 9.5 | 30 | — | 28.4 | 30 | 0 | 30 | 0 | 30 |
| α-MS/AN | — | 11.3 | — | — | 12.4 | — | — | 10.8 | 0 | 10.8 |
| % Rubber | 13.8 | 20 | 21.7 | 14.7 | 20 | 22.2 | 13.5 | 13.5 | 14.5 | 14.5 |
| Izod Impact Strength J/m notch × 10² | 0.86 | 1.40 | 1.23 | 0.89 | 1.37 | 1.51 | 0.49 | 1.43 | 0.58 | 1.71 |
| DTUL in °C. | 128 | 116 | 121 | 133 | 114 | 118 | — | — | — | — |

As can be seen from the above, the substitution of a cyclopentene homopolymer or copolymer for polybutadiene produces very comparable results indicating that the effects shown do not depend on the use of polybutadiene.

The above Examples are for the purposes of illustration only and are not intended to represent any limitation in the scope of the invention. It is anticipated that many minor variations and modifications in the invention disclosed herein could be made without departing from the essence thereof and all such variations and modifications are included within the purview of this invention.

What is claimed is:

1. A polyblend comprising:
   A. from 10 to 90% by weight of an ABS polymer consisting essentially of:
      (1) a matrix copolymer; and
      (2) a rubber substrate grafted with a superstrate copolymer; wherein the rubber substrate provides from 5 to 70% of the weight of the ABS polymer and has a glass transition temperature below 0° C., and wherein the matrix copolymer and the superstrate copolymer are each formed by the polymerization of a vinylaromatic monomer selected from the group consisting of styrene and substituted styrenes and an unsaturated nitrile monomer selected from the group consisting of acrylonitrile and methacrylonitrile, and contain the vinylaromatic monomer and the unsaturated nitrile monomer in a weight ratio of from 80:20 to 60:40; and
   B. from 90 to 10% by weight of a polymeric composition comprising
      (1) a rubber substrate having a glass transition temperature below 0° C.; and
      (2) a superstrate polymer grafted onto the rubber substrate which comprises from 40 to 85% by weight of a vinylaromatic monomer and from 15 to 35% by weight of an unsaturated dicarboxylic acid anhdride,
   said polymeric composition having been formed by the polymerization of the said monomers in the presence of from 2 to 30%, based on the weight of the polymeric composition, of said rubber;
   wherein the total amount of rubber in the polyblend is in the range of from 5 to 40% of the total weight of the polyblend, with the proviso that each of components A and B, contribute at least 5% of the total amount of rubber in the polyblend.

2. The polyblend of claim 1 in which the superstrate polymer of component B further contains up to 30% by weight of a copolymerizable monomer.

3. The polyblend of claim 2 in which the copolymerizable monomer is selected from the group consisting of $C_4$ to $C_6$ α-olefins, $C_1$ to $C_3$ alkyl esters of acrylic and methacrylic acids, acrylonitrile and methacrylonitrile.

4. The polyblend of claim 1 wherein the ABS polymer component comprises from 75 to 25% and the polymeric composition correspondingly provides from 25 to 75% of the total polyblend weight.

5. The polyblend of claim 1 in which the ABS polymer and the polymeric composition each provides at least 10% by weight of the total rubber content of the polyblend measured as ungrafted rubber.

6. The polyblend of claim 1 in which the total rubber content of the polyblend, measured as ungrafted rubber, is from 10 to 30% by weight of the polyblend.

7. The polyblend of claim 1 in which the ABS polymer comprises a matrix component that is a copolymer of α-methyl styrene and acrylonitrile.

8. The polyblend of claim 1 in which the rubber comprises from 5 to 25% of the weight of the polymeric composition (cOmponent B).

9. The polyblend of claim 1 in which the unsaturated dicarboxylic acid anhydride is maleic anhydride.

10. The polyblend of claim 1 in which the rubber substrate of component B is a copolymer of cyclopentene with a minor proportion of a non-cyclic α-olefin.

11. The polyblend of claim 1 in which the polymeric composition consists of a butadiene rubber substrate with a superstrate grafted thereon, dispersed in a matrix polymer, wherein the superstrate and matrix polymers each consist of styrene and maleic anhydride in a weight ratio of 85:15 to 65:35.

12. A polyblend comprising:
A. from 25 to 75% by weight of an ABS polymer consisting essentially of:
(1) a matrix copolymer; and
(2) a rubber substrate grafted with a superstrate copolymer; wherein the rubber substrate provides from 5 to 50% of the weight of the ABS polymer and has a glass transition temperature below 0° C., and wherein the matrix copolymer and the superstrate copolymer are each formed by the polymerization of a vinylaromatic monomer selected from the group consisting of styrene and substituted styrenes and an unsaturated nitrile monomer selected from the group consisting of acrylonitrile and methacrylonitrile and contain the vinylaromatic monomer and the unsaturated monomer in a weight ratio of from 80:20 to 60:40; and
B. from 75 to 25% by weight of a polymeric composition comprising
(1) a rubber substrate having a glass transition temperature below 0° C.; and
(2) a superstrate polymer grafted onto the rubber substrate which comprises from 40 to 85% by weight of styrene and from 15 to 35% by weight of maleic anhydride,
said polymeric composition having been formed by the polymerization of the said monomers in the presence of from 2 to 30%, based on the weight of the polymeric composition, of said rubber,
wherein the total amount of rubber in the polyblend is in the range of from 5 to 40% of the total weight of the polyblend, with the proviso that each of components A and B, contribute at least 5% of the total amount of rubber in the polyblend.

13. The polyblend of claim 12 in which the ABS polymer additionally contains a matrix polymer selected from copolymers of stryene or α-methylstyrene with acrylonitrile.

14. A polyblend comprising:
A. from 75 to 25% by weight of an ABS polymer consisting essentially of (i) a rubber substrate with a glass transition temperature below −30° C. grafted with acrylonitrile and at least one vinylaromatic monomer selected from the group consisting of styrene and α-methylstyrene, dispersed in (ii) a matrix polymer formed by copolymerization of acrylonitrile and at least one vinylaromatic monomer selected from the group consisting of stryene and α-methylstyrene in which the rubber is present in an amount that is from 5 to 70% of the weight of the ABS polymer and in which the ratio of the weight of the vinylaromatic monomer to the weight of acrylonitrile in the ABS polymer is from 60:40 to 80:20; and
B. from 25 to 75% by weight of a polymeric composition comprising a diene rubber substrate having a glass transition temperature below −30° C., grafted with a superstrate polymer and dispersed in a matrix polymer wherein the matrix polymer and the superstrate polymer taken together comprise from 40 to 85 parts by weight of styrene, from 15 to 35 parts by weight of maleic anhydride and from 0 to 30 parts by weight of a copolymerizable termonomer selected from the group consisting of isobutylene, methyl methacrylate and acrylonitrile said polymeric composition having been formed by the polymerization of the said monomers in the presence of from 5 to 25%, based on the weight of the polymeric composition, of said rubbers;
the proportions and compositions of A and B being selected such that the total amount of rubber in the polyblend measured as ungrafted substrate is from 10 to 30% of the weight of the polyblend and such that each of A and B supplies at least 10% of the total weight of the rubber, measured as ungrafted substrate, in the polyblend.

15. The polyblend of claim 14 in which the ABS polymer provides from 60% to 90% of the total amount of rubber, measured as ungrafted substrate, in the polyblend.

16. The polyblend of claim 14 in which the polymeric composition comprises from 2 to 10% by weight of isobutylene based on the combined weights of the matrix and superstrate polymers in the polymeric composition.

17. The polyblend of claim 14 in which the polymeric composition comprises from 2 to 20% by weight of methyl methacrylate based on the combined weights of the matrix and superstrate polymers in the polymeric composition.

18. The polyblend of claim 14 in which the polymeric composition comprises from 2 to 20% by weight of acrylonitrile based on the combined weights of the matrix and superstrate polymers in the polymeric composition.

19. A polyblend comprising:
A. from 75 to 25% by weight of an ABS polymer consisting essentially of (i) a rubber substrate with a glass transition temperature below −30° C. grafted with acrylonitrile and at least one vinylaromatic monomer selected from the group consisting of styrene and α-methylstyrene, dispersed in (ii) a matrix polymer formed by copolymerization of acrylonitrile and at least one vinylaromatic monomer selected from the group consisting of styrene and α-methylstryene in which the rubber is present in an amount that is from 5 to 70% of the weight of the ABS polymer and in which the ratio of the weight of the vinylaromatic monomer to the weight of acrylonitrile in the ABS polymer is from 60:40 to 80:20; and B. from 25 to 75% by weight of a polymeric composition comprising a diene rubber having a glass transition temperature below −30° C., grafted with a superstrate polymer and dispersed in a matrix polymer wherein the matrix polymer and the superstrate polymer taken together comprise from 55 to 83 parts by weight of styrene, from 15 to 35 parts by weigh of maleic anhydride and from 2 to 20 parts by weight of a copolymerizable monomer selected from the group consisting of methyl methacrylate and acrylonitrile, said polymeric composition having been formed by the polymerization of the said monomers in the presence of from 5 to 25% based on the weight of the polymeric composition, of said rubber;

the proportions of A and B being selected such that the total amount of rubber in the polyblend measured as ungrafted substrate is from 10 to 30% of the weight of the polyblend and such that each of A and B supplies at least 10% of the total weight of the rubber, measured as ungrafted substrate, in the polyblend.

* * * * *